March 4, 1924.

C. M. WOLFE 1,485,749

MACHINE FOR PREPARING STEAK

Filed Aug. 2, 1922

2 Sheets-Sheet 1

Inventor
C. M. Wolfe
By C. A. Snow & Co.
Attorney

March 4, 1924.

C. M. WOLFE 1,485,749

MACHINE FOR PREPARING STEAK

Filed Aug. 2, 1922

2 Sheets-Sheet 2

Inventor
C. M. Wolfe
By C A Snow & Co
Attorney

Patented Mar. 4, 1924.

1,485,749

UNITED STATES PATENT OFFICE.

CLINTON M. WOLFE, OF COEBURN, VIRGINIA.

MACHINE FOR PREPARING STEAK.

Application filed August 2, 1922. Serial No. 579,312.

*To all whom it may concern:*

Be it known that I, CLINTON M. WOLFE, a citizen of the United States, residing at Coeburn, in the county of Wise and State of Virginia, have invented a new and useful Machine for Preparing Steak, of which the following is a specification.

This invention aims to provide novel means whereby beef steak may be prepared for cooking, the machine hereinafter described being adapted to render the beef steak tender, without pounding in the usual way.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
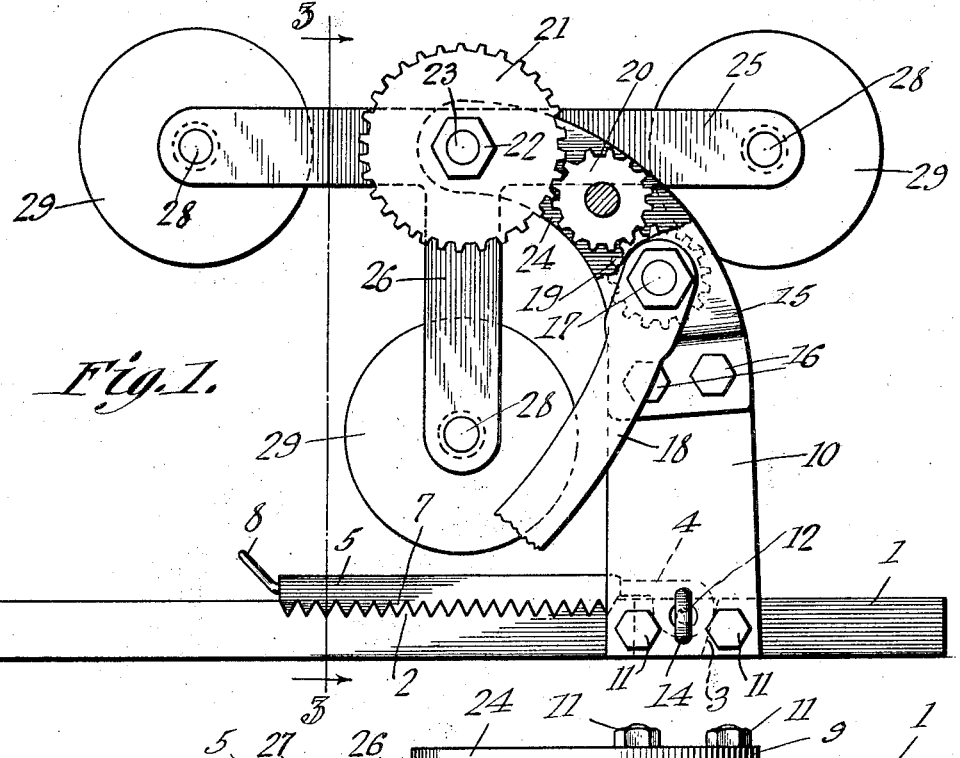
Figure 2:
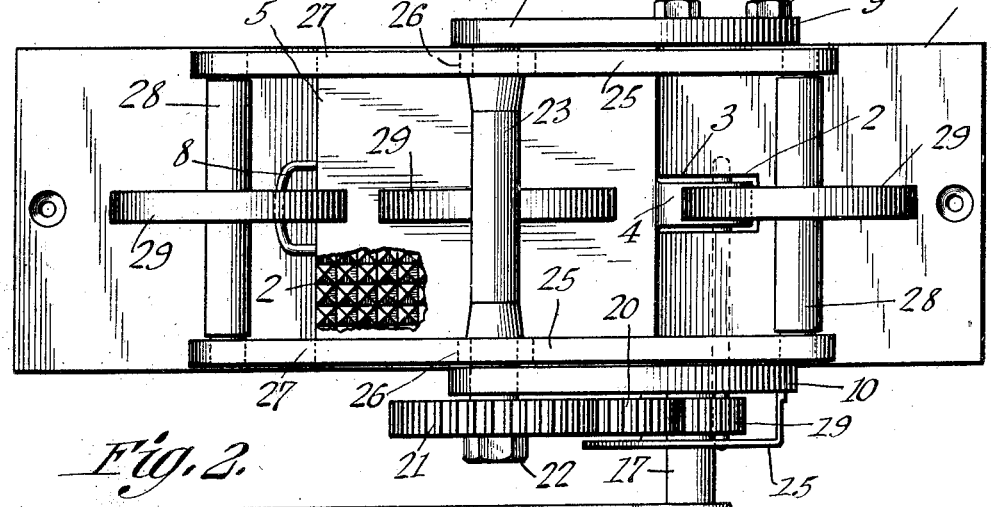
Figure 3:
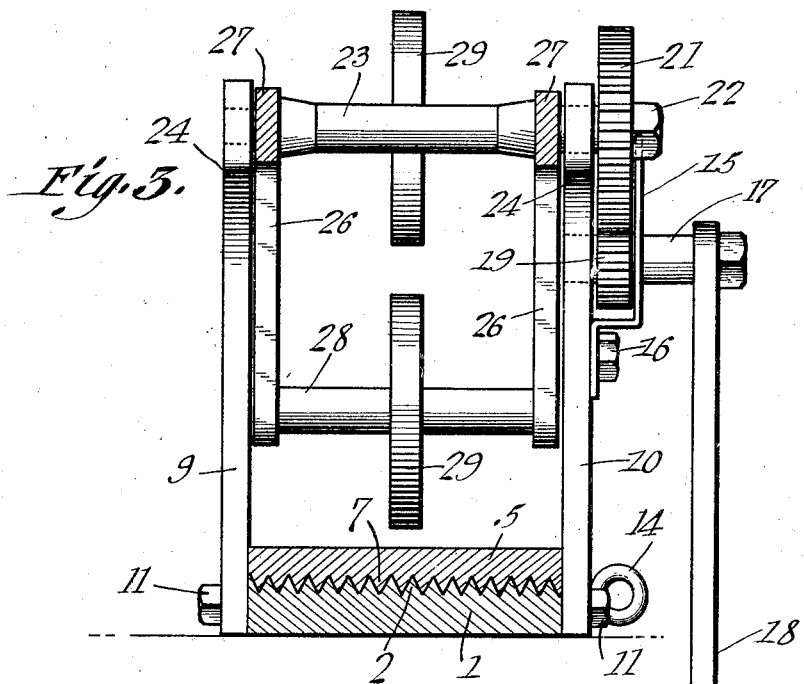
Figure 4:
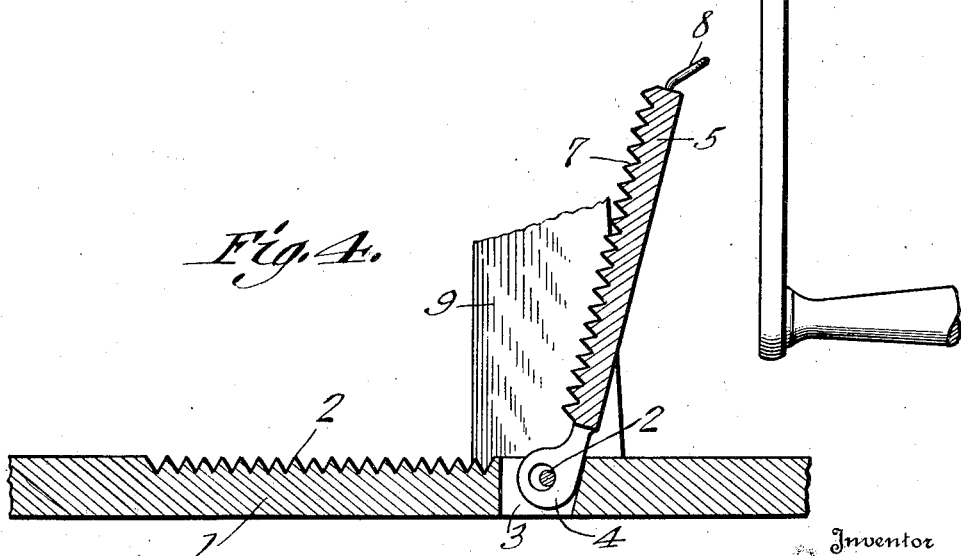

Figure 1 shows in side elevation, a meat tenderer embodying the invention parts being broken away and the crank being omitted; Figure 2 is a top plan wherein parts are broken away; Figure 3 is a section on the line 3—3 of Figure 1; Figure 4 is a fragmental longitudinal section, parts being omitted.

The machine forming the subject matter of this application includes a frame comprising a base 1, equipped intermediate its ends with a roughened surface 2 and supplied with an opening 3. The numeral 5 marks a pressure member, in the form of a plate, having a reduced stem 4 received in the opening 3, the lower surface of the pressure member being roughened, as at 7, to cooperate with the roughened surface 2 of the base 1. The free end of the pressure member 5 has a handle 8.

Standards 9 and 10 are attached by securing elements 11 to the edges of the base 1. A pivot element 12, in the form of a pin, having a head 14, is inserted through the standard 10 and through a portion of the base 1, the pivot element passing through the stem 4 of the pressure member 5 and constituting a mounting whereon the pressure member may be swung vertically toward and away from the base 1, to permit the beef steak which is to be tendered to be placed between the pressure member and the base.

The standard 10 has an offset bracket 15 which is secured to the standard as shown at 16. A drive shaft 17 is journaled for rotation in the bracket 15 and in the standard 10. Any suitable means may be provided for rotating the drive shaft 17: if the machine is to be operated by hand, the means for driving the shaft 17 may be in the form of a crank 18, but if the machine is to be operated by power, the appropriate equivalent for the crank 18 will be substituted therefor. A gear wheel 19 is secured to the drive shaft 17 and is located between the bracket 15 and the standard 10. The gear wheel 19 meshes into an intermediate pinion 20 journaled between the standard 10 and the bracket 15. The intermediate pinion 20 meshes into a gear wheel 21 secured at 22 to a driven shaft 23 mounted in the upper ends of the standards 9 and 10, the standards being curved as at 24, at their upper ends, so as to dispose the shaft 23 immediately above the pressure member or plate 5. The shaft 23 is provided with a pair of arms 25, with a pair of arms 26 and with a pair of arms 27. The arms 25 are longer than the arms 26, and the arms 26 are longer than the arms 27. Shafts 28 are journaled in the outer ends of the arms 25—25, 26—26 and 27—27, and carry rollers 29 adapted to cooperate, one at a time, with the pressure member 5.

By rotating the shaft 23, the arms 25, 26 and 27 may be so disposed that the pressure member 5 may be swung upwardly by means of the handle 8 on its pivotal mounting 12, and the piece of beef steak which is to be tendered may be placed between the pressure member 5 and the base 1, whereupon the pressure member is swung downwardly on the beef steak. At this point it may be observed that the pivot element 12 may be withdrawn at any time, thereby detaching the pressure member 5, to the end that the roughened surface 7 of the pressure member, and the corresponding surface 2 of the base 1 may be cleaned.

By means of the crank 18 or its equivalent, motion is transmitted to the drive shaft 17, and by way of the gear wheel 19, the pinion 20 and the pinion 21, a rocking movement may be imparted to the shaft 23, any one of the rollers 29 being caused to ride backwardly and forwardly along the pressure member 5, the pressure member being thrust downwardly upon the steak, and the steak being rendered tender, without resorting to the common pounding operation. Since the arms 25, 26 and 27 are of different lengths, pieces of steak of different thicknesses may be accommodated between the pressure member 5 and the base 1, and, likewise, the piece of steak may be subjected to a heavy pressure or a light pressure, at the will of an operator.

The shaft 23 and parts carried thereby may be alluded to briefly as a compression means cooperating with the pressure member 5.

The gear wheel 19, the pinion 20 and the gear wheel 21 form a reducing train connecting the drive shaft 17 with the driven shaft 23.

What is claimed is:—

1. A machine for preparing beef steak, comprising a base; a pressure member cooperating with the base; and compression means mounted for oscillatory movement above the pressure member, the compression means comprising parts of different lengths and adapted to cooperate, one at a time, with the pressure member.

2. A machine for preparing beef steak, comprising a base; a pressure member movable above the base; a standard carried by the base; a shaft mounted to rotate in the standard; and arms of different lengths carried by the shaft, the arms being provided with elements adapted to cooperate one at a time with the pressure member.

3. A machine for preparing beef steak, comprising a base; a pressure member hinged to the base; a shaft mounted for rocking movement above the base; arms of different lengths carried by the shaft and coacting one at a time with the pressure member; a driving means; and a reducing train interposed between the driving means and the shaft.

4. In a device of the class described, a base, a pressure member movable above the base, a standard carried by the base, a shaft mounted to rotate on the standard, means for rotating the shaft, an arm carried by the shaft and a roller journaled on the arm, the roller cooperating with the pressure member and being movable longitudinally of the pressure member in an arc of fixed radius whereof the shaft is the center.

In testimony that I claim the foregoing as my own, I have hereto affixed my signature.

CLINTON M. WOLFE.